United States Patent [19]

McCubbrey et al.

[11] Patent Number: 4,685,144

[45] Date of Patent: Aug. 4, 1987

[54] IMAGE PROCESSING SYSTEM WITH TRANSFORMATION DETECTION

[75] Inventors: David McCubbrey; Theron Friedman, both of Ann Arbor, Mich.

[73] Assignee: Environmental Research Institute of Michigan, Ann Arbor, Mich.

[21] Appl. No.: 665,667

[22] Filed: Oct. 29, 1984

[51] Int. Cl.[4] .............................................. G06K 9/00
[52] U.S. Cl. ..................................... 382/49; 364/131
[58] Field of Search .................... 382/49, 41; 364/130, 364/131, 137

[56] References Cited

U.S. PATENT DOCUMENTS 4,395,699 7/1983 Sternberg .............................. 382/49

Primary Examiner—Leo H. Boudreau
Attorney, Agent, or Firm—Krass & Young

[57] ABSTRACT

Provision is made in a serial neighborhood transformation stage for generating statistical information relating to the number of transformations performed by the stage. This information can be transferred back to a host computer separately from the image pixels to indicate that there has been no change in the image being operated on by the stage or that a certain number of transformations have occured.

5 Claims, 5 Drawing Figures

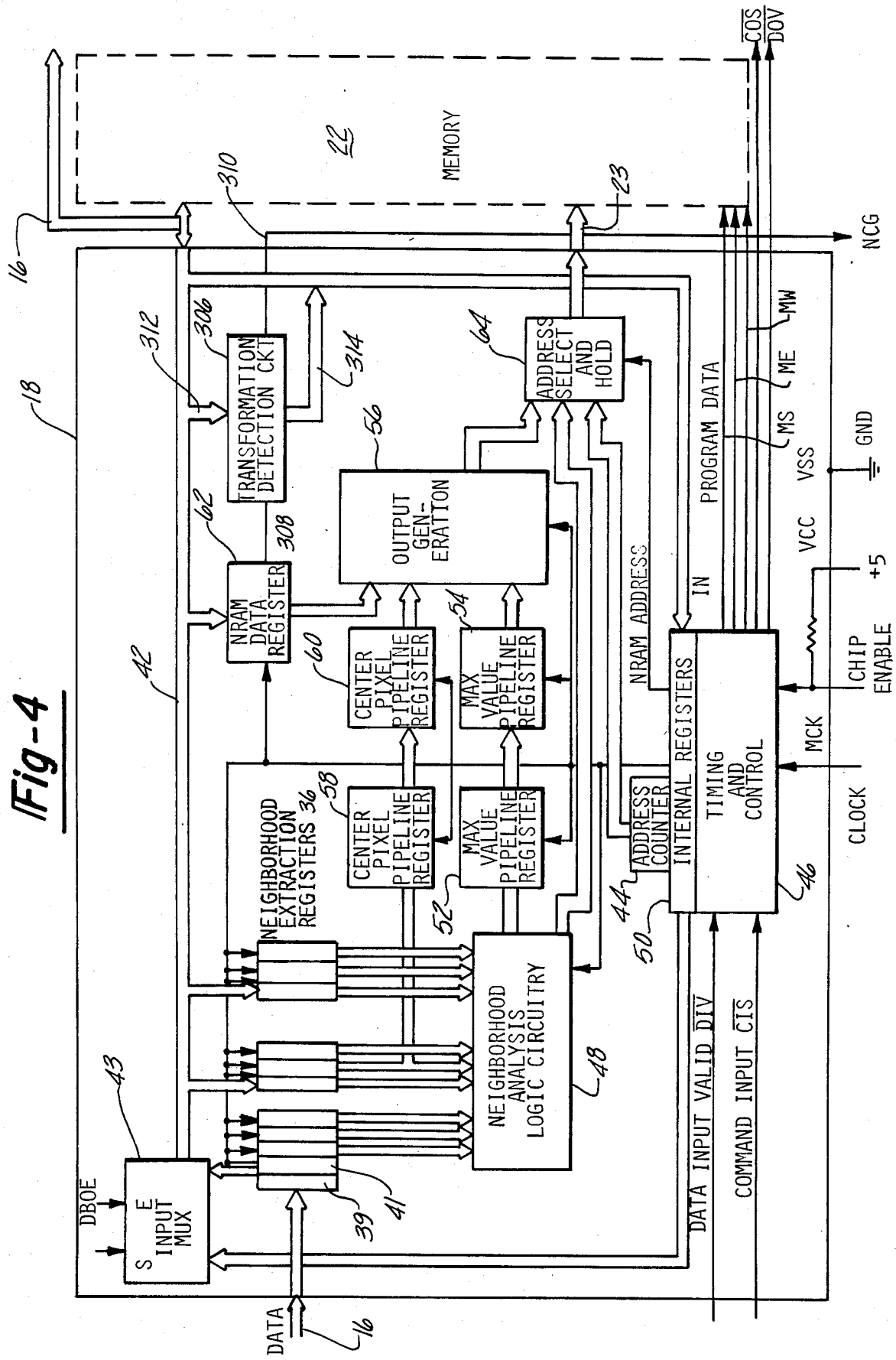

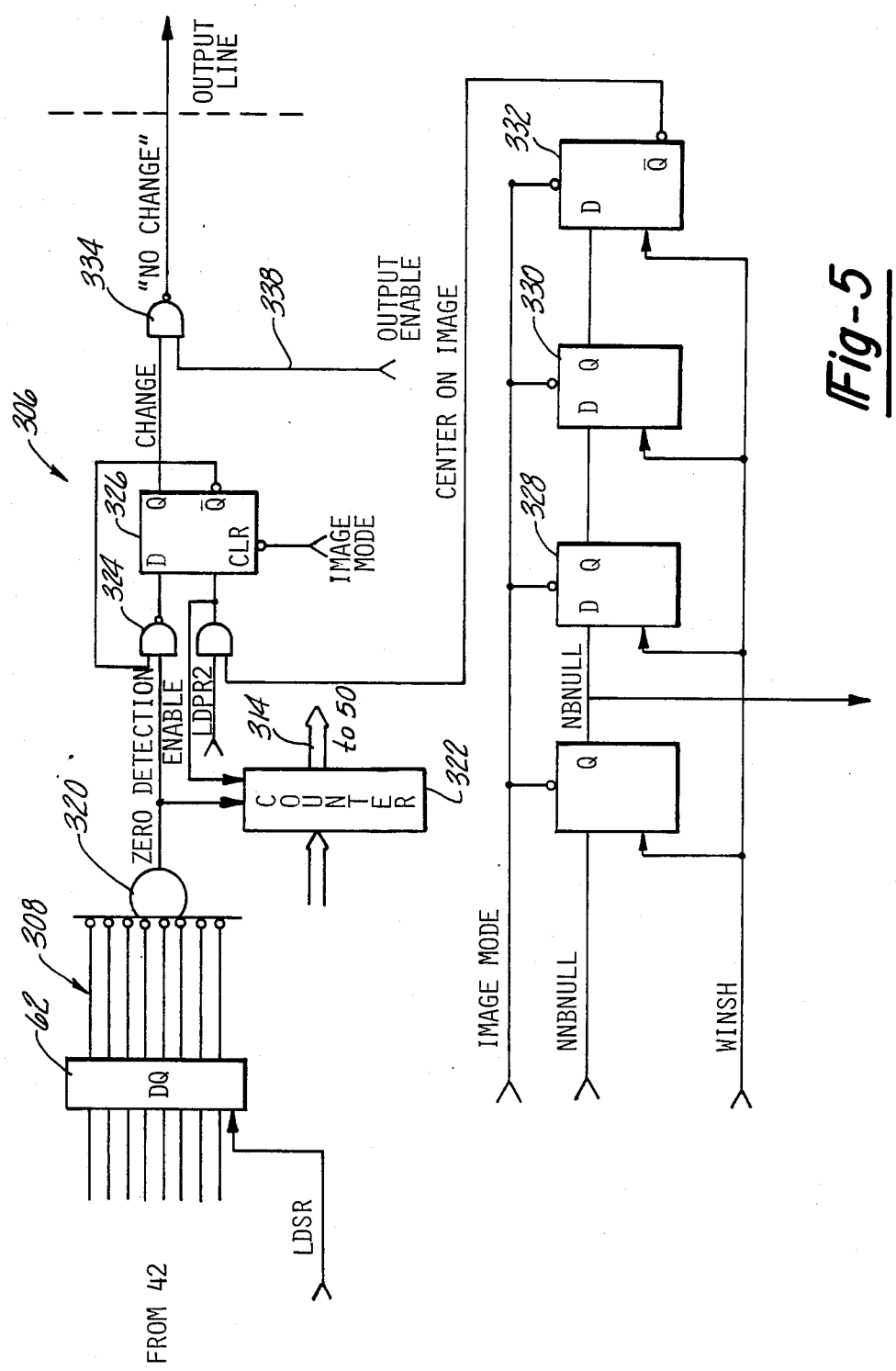

IMAGE PROCESSING SYSTEM WITH TRANSFORMATION DETECTION

TECHNICAL FIELD

This invention relates to image processing systems and, more particularly, to image processing systems using neighborhood transformation stages.

BACKGROUND ART

Parallel array image processors have been used in the past to analyze image data. These array processors generally include a large number of processing modules, one for each pixel in the image. The modules operate substantially simultaneously on the entire image and thus, this type of system is capable of processing image data quite rapidly. However, there are a number of inherent problems with these systems based upon processing element arrays. These include excessive hardware complexity, real-time processing band-width limitations and input/output difficulties.

The shortcomings of parallel array image processors led the Environment Research Institute of Michigan, the assignee of the present invention, to develop an alternative special purpose image processing system. In contrast to the parallel array approach, the image pixels are fed in sequential line scan format to the input of at least one serial neighborhood processing stage. To increase processing time, a plurality of identical stages are connected together in a pipeline. As the pixel data is shifted through the stage, registers are used to sequentially extract a group of neighboring pixels in the image. Neighborhood transformation logic is utilized to perform a pre-programmed transformation of the center pixel based upon the values of the center and its neighbors. Neighborhood transformations are computed at the data transfer clock rate thereby allowing the output of the stage to appear at the same rate as the input. Thus, one pre-programmed transformation is generated for all of the pixels in the image during one pass of the image data through the stage. When a pipeline of stages are utilized, the serial transformed pixel string is coupled to the input of the next stage where another transformation can be carried out.

For further details of such an image processing system the reader is referred to U.S. Pat. No. 4,167,728 entitled "Automatic Image Processor"; U.S. Pat. No. 4,322,716 entitled "Method and Apparatus for Pattern Recognition and Detection", and U.S. Pat. No. 4,398,176 entitled "Image Analyzer With Common Data/Instruction Bus". The above identified patents are hereby incorporated by reference.

The image processing system described above generally employs a host computer which communicates with the special purpose neighborhood transformation stages. The host computer acts as a master controller and operates to perform functions such as programming the stages and transferring the image data between the stages. After the image has been transformed by the transformation stages, the host computer is often used to perform additional analyses on the transformed image. Unfortunately, the transfer of the transformed image from the stages to the host computer takes a considerable amount of time.

In many cellular pattern recognition algorithms, it is often necessary to repeat a transformation of the image until there is no change therein. In other words, it is sometimes necessary to process the image until the pixel values therein no longer are changed in value during one pass through the neighborhood transformation stage. Currently, this is accomplished by using the host computer to perform a pixel by pixel comparison between two images. One image (old) having pixel values that have not been operated on by the stage(s) and the other image (new) having pixel values which have passed through the transformation stage or stages. When the transformation stage has not transformed any of the pixel values in the new image, these two images are identical and therefore it is established that there is no longer any need for passing the image through the stages to undergo any more transformations. Unfortunately, it is computationally expensive and time consuming for the host computer to compare two images for equality since the images typically contain thousands of individual pixels.

SUMMARY OF THE INVENTION

Pursuant to the present invention, means are provided in each serial neighborhood transformation stage to generate statistical information relating to the transformed image processed by the stage. In the preferred embodiment, the statistical information contains data relating to the number of transformations, if any, performed by the stage. The statistical information is generated in a form such that it can be transferred to the host computer separately from the image pixels. In such manner, the host computer is provided with important information without the time consuming necessity of transferring the transformed pixels from the stage back to the host computer, with the host computer being required to perform an image to image comparison to determine whether or not there has been a change in the image as a result of the operations performed by one or more of the stages.

BRIEF DESCRIPTION OF THE DRAWINGS

The various advantages of the present invention will be apparent to one skilled in the art upon reading the following specification and by reference to the drawings in which:

FIG. 4 is a block diagram of the processor portion of a neighborhood transformation stage utilizing the transformation detection circuit of the preferred embodiment;

FIG. 5 is a schematic circuit diagram showing in more detail the circuitry making up the transformation detection circuit shown in FIG. 4.

DESCRIPTION OF THE PREFERRED EMBODIMENT

Figure 1:
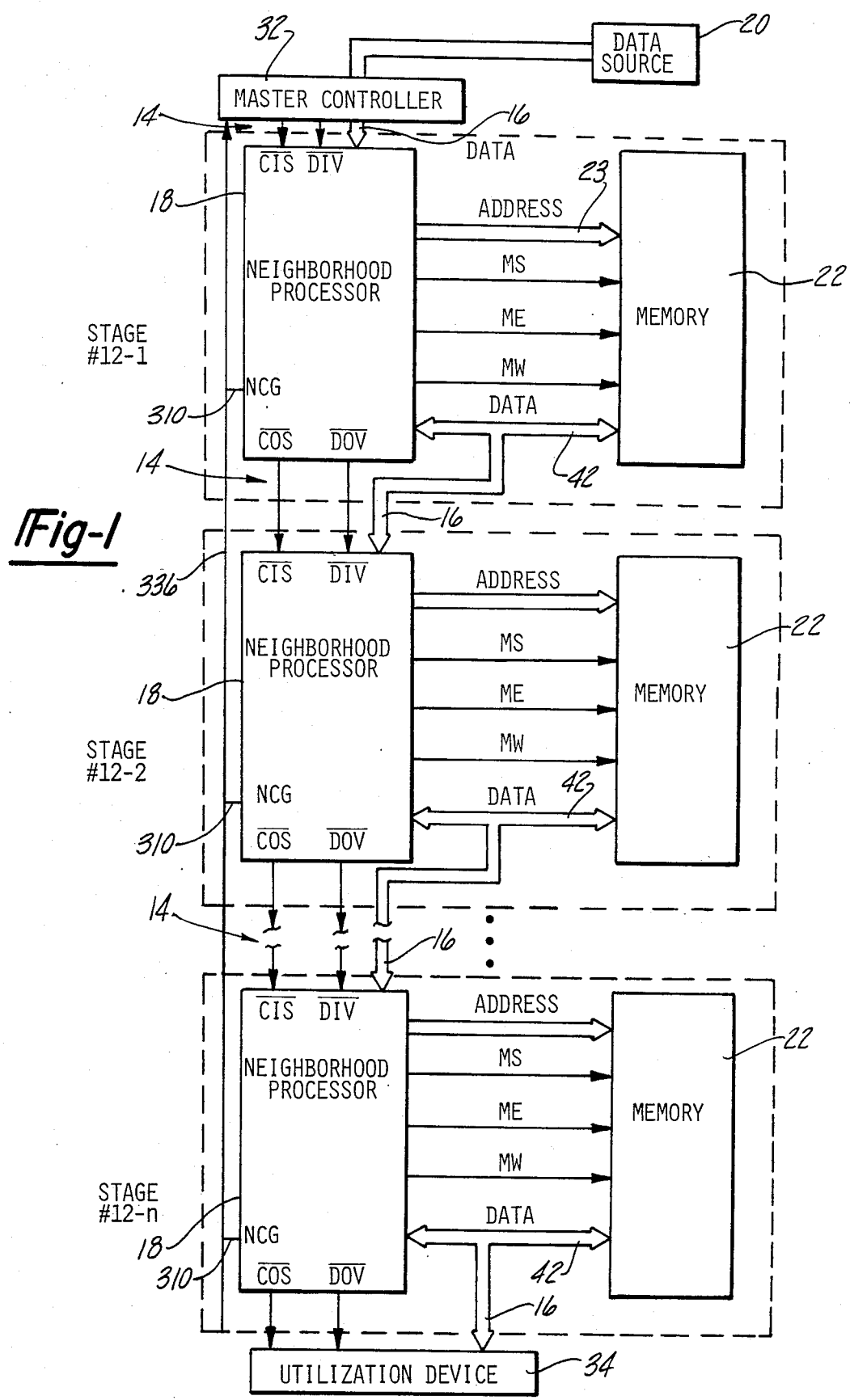
FIG. 1 is a schematic diagram of an image processing system utilizing the teachings of the present invention.

The present invention will be described as an improvement to the image processing system disclosed in detail in the aforementioned U.S. Pat. No. 4,398,176, which as noted above, is incorporated by reference. To the extent possible, the same reference numerals are used in the drawings herein that were used in that patent to aid the reader in ascertaining the correspondence between the figures. New or different elements pertaining to the present invention will bear reference numerals of 300 and above.

By way of background, the image processing system 10 includes one or more neighborhood transformation or processing stages 12-1 to 12-N. In FIG. 1, the processing stages 12 are shown connected serially in a pipeline. Such an implementation increases processing speed but if this is not an overriding concern the system may use just one stage, with the pixel data being recirculated through the stage as necessary. The data communication line 14 includes two input control lines, CIS and DIV, two output control lines, COS and DOV and an 8-bit unit directional bus 16. The bus 16 supplies both pixel data and control instructions for programming the stages.

Each stage 12 includes a processor portion 18 for analyzing the pixel values and supplying a transformation output, if transformation occurs, to an input of the suceeding stage. The pixel values represent an image matrix stored in data source 20. Each pixel may have a value from 1 to 256 in this embodiment. A master controller 32 communicates with each stage and serves as a host computer capable of generating and transmitting program control instructions. Controller 32 was used, in the past, to perform the image by image comparison to determine whether the image has been transformed by the stages.

Figure 2:
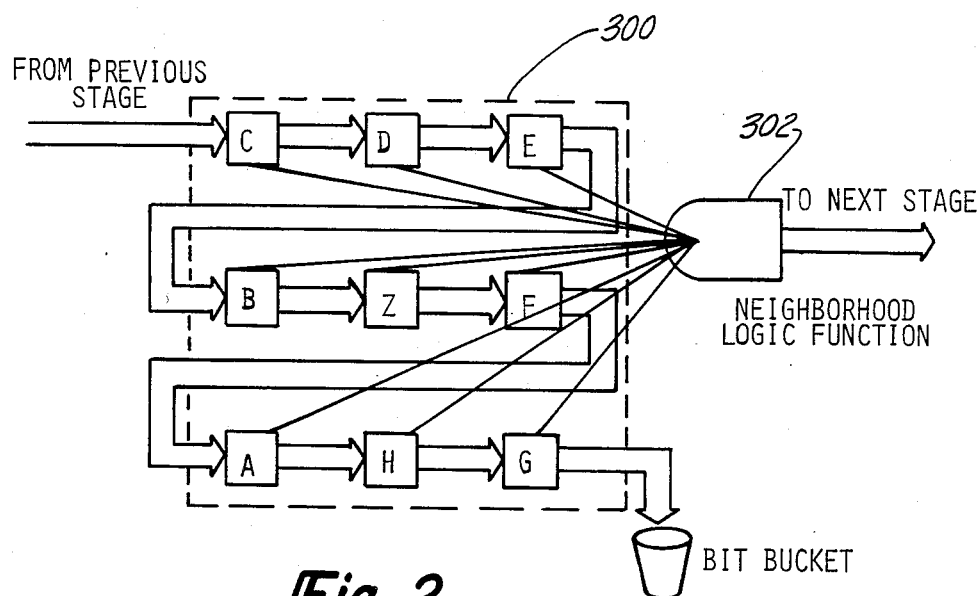
FIG. 2 is a schematic view useful in understanding the transformation operation on the image pixels.
Figure 3:
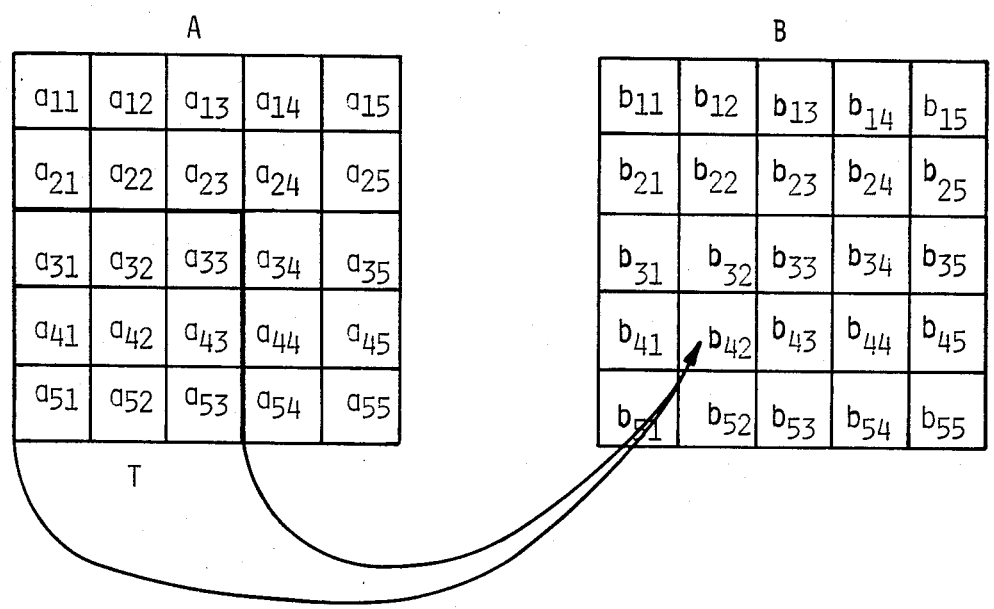
FIG. 3 is another schematic view useful in understanding the transformation of the image pixels.

The nature of the transformation capable of being performed by each stage is best understood by reference to FIGS. 2 and 3. Pixels enter the stage in a raster line scan format and are sequentially loaded into a neighborhood extraction array 300 as shown in FIG. 2. Various means can be used to accomplish this function but in this embodiment this is performed by way of memory 22 which loads the registers in array 300 as discussed in the referenced patent. The array 300 is sequentially loaded with new pixel values to that it sequentially accesses substantially all of the neighborhoods in the image. The neighborhood consists of a center pixel value (Z) and a group of eight neighbors (A-H) which surround the center pixel. The highlighted square in FIG. 3 is an example of one extracted neighborhood in a simplified image matrix A which is input to the stage. Based upon the values of the center pixel and its neighbors, neighborhood transformation logic 302 will either transform the center pixel into.a new value or leave it unchanged. In FIG. 3 the pixel value $b_{42}$ represents the results of the transformation operation for a given neighborhood. Thus it can be seen that the center pixel may or may not be changed depending upon the pixel values of the extracted neighborhood. In many instances, the original image matrix will undergo several transformations carried out by the first several stages in the pipeline but will eventually reach a point where no more transformations will be performed by a stage. This is because the pixel values will have been previously transformed to values that do not require a change in value of the center pixel in each neighborhood.

FIG. 4 is a somewhat more detailed circuit diagram of the processor portion 18 of the stage. In FIG. 4, the neighborhood extraction registers 36 performs the function of array 300 previously discussed in connection with FIG. 2. The pixel values in each extracted neighborhood are analyzed by neighborhood analysis logic circuitry 48 which provides an 8-bit vector (referred to as an NRAM address) which will vary depending upon the pixel values and the nature of the analysis performed by circuitry 48. The generated NRAM address for each neighborhood is selected by multiplexing device 64 and used to address a section of memory 22 which comprises a table of transformation related signals which are programmed into each stage by controller 32. The value addressed in memory 22 is then loaded into NRAM register 62 over internal bus 42. If the value loaded into NRAM register 62 is zero this means that the center pixel value (Z) will be unchanged, i.e. no tranformation for that neighborhood. On the other hand, if the NRAM register 62 contains non-zero values, the center pixel will be changed or transformed to that NRAM value. In general, the transformed value of the center pixel, if there is to be a transform, is output over data bus 16 to the next stage in the pipeline. This value generally corresponds to the pixel position $b_{42}$ in FIG. 3.

From the foregoing explanation it can be appreciated that some means is provided in the neighborhood logic circuitry (e.g. circuitry 302 in FIG. 2) for determining whether or not the center pixel is to be transformed. In the particular embodiment of FIG. 4 this is accomplished by way of the contents of NRAM register 62.

Pursuant to the present invention transformation detection circuitry 306 is provided with an input 308 connected to NRAM register 62. The value on inut 308 contains information indicating whether or not the center pixel is to be transformed. Transformation detection circuit 306 is provided with an output 310 labeled NCG which provides an output signal that can be communicated directly back to host controller 32 as shown in FIG. 1. The state of NCG line 310 will indicate whether or not any neighborhood has been transformed by the stage. Controller 32 can detect this occurrence quite quickly without requiring the previous image to image comparison. In other words, the output line 310 contans information that can be transferred to the host computer or controller 32 separately from the image pixels. Controller 32 can use this information for such things as reprogramming subsequent stages in the pipeline to perform other processing functions since controller 32 now knows that it is no longer necessary to continue passing the image data through the stages to reach a point where no further transformations will occur to the image.

Transformation detection circuit 306 may also include a counter which counts the number of times that the center pixel is transformed. The counter may be initialized by way of instructions over internal data bus 42 via input 312 in FIG. 4. In this embodiment, the contents of the counter is output over lines 314 and stored in the internal registers 50. To read out the contents of the counter in each stage, controller 32 generates a local readback-internal (LRI) command which causes the stage to empty the contents of its internal registers onto the outgoing data bus 16. The output of the data bus of the last station stage of pipeline can be connected back to the controller 32 to supply this information. If the contents of the counter of only one particular stage is desired to be read, controller 32 can program subsequent stages in the pipeline to pass this information over their respective data buses 16 and 42 until it is output from the last stage in the pipeline.

FIG. 5 shows the details of the transformation detection circuitry 306. The NRAM register 62 is shown with eight output lines comprising the input line 308 to the transformation detection circuit 306 of FIG. 4. This is because the output of NRAM register 62 may be any value from zero (no transformation) to 255 depending upon the analysis of the neighborhood pixel values. The output lines comprising input 308 are inverted and coupled to an AND gate 320. Thus, the output of AND gate 320 goes high whenever there is to be no transformation for the detected neighborhood. It will be remembered that the output of NRAM register 62 will be zero when there is no transformation to be made. The output of AND gate 320 is coupled to the input of a counter 322. Counter 322 is incremented every time a transformation is made for a neighborhood. Thus, counter 332 accumulates the total number of transformations that are made for each image analyzed by a stage. The output of counter 322 is stored via output line 314 in the internal registers 50 of FIG. 4.

The output of AND gate 320 is also fed through NAND gate 324 into the D input of flip-flop 326. The networks comprising flip-flops 328, 330 and 332 are used to initialize the state of flip-flop 326. The control signal IMAGEMODE is derived from the circuitry shown in FIG. 11C of the referenced patent whereas the control signals NNBNULL and WINSH are derived from circuitry shown in FIGS. 11D of the referenced patent. Before an image has entered the stage, the IMAGEMODE signal is false thus forcing the outputs of flip-flop 328, 330 and 332 to go high. The output of flip-flop 332 combined with the signal LDPR2 (from FIG. 11C of the referenced patent) causes flip-flop 326 to go low. Thus, the transformation detection circuitry 306 assumes initially that no change will occur in the image. During image processing, if any neighborhood is to be transformed, the output of NRAM register 62 will be non-zero and this is detected by AND gate 320. As long as no changes or transformations have occurred, the Q output of flip-flop 326 remains low. However, if any transformations are detected by AND gate 320, its output goes false, thus forcing the output of flip-flop 326 to go true. The feedback provided by the Q output of flip-flop 326 through gate 324 prevents flip-flop 326 from changing state back to low if any further instances of a transformation should occur during processing of the image. In other words, once a transformation is detected, the flip-flop 326 is latched into a high state.

Flip-flops 328, 330 and 332 also cooperate to prevent clocking of flip-flop 326 unless the NRAM register 62 contains valid information i.e., that the center pixel value in the neighborhood is "on image" and is not associated with invalid or "off image" pixels.

The Q output of flip-flop 326 is connected to NAND gate 334. In the preferred embodiment, NAND gate 334 is an open collector device. This means that the output lines 310 of each stage 12-1 to 12-N can be connected together via a single line 336 (FIG. 1) back to master controller 32. Thus, if a change (transformation) occurs in any stage then line 326 will be low. However, if no transformation occurs in all of the stages in the pipeline then line 326 will be high. If it is desired to test whether a transformation occurred in any particular stage, then the master controller 32 programs one of the two uncommitted bits in the internal registers 50 (see FIG. 9 of the referenced patent) to enable NAND gate 334 via line 338 of the selected stage and to disable the NAND gate 334 in the non-selected stages. Thus, by providing a value of zero in the selected control bit in the internal registers 50 to a value of zero, the line 338 will cause the output of gate 334 to remain high regardless of whether of not there are any transformations in a particular stage.

From the foregoing, those skilled in the art can appreciate that the present invention provides a meritorious improvement over known neighborhood transformation stages and permits the image processing system to efficiently obtain extremely useful data about the transformation process occurring in each stage. While this invention has been described in connection with a particular example, it should be realized that skilled practitioners will find that other modifications can be made after a study of the specification, drawings and the following claims.

We claim:

1. An image processing system having at least one neighborhood transformation stage in communication with a host computer, said neighborhood transformation stage including neighborhood extraction means for sequentially accessing a group of neighboring pixels in the image, and transformation logic means for either transforming or not transforming a given pixel in the neighborhood into a new value as a function of the values of other pixels in the neighborhood, wherein the improvement comprises:

at least one transformation detection means, each connected to a corresponding neighborhood transformation stage, for providing an output signal indicating whether or not a transformation has occurred for said given pixel in each accessed neighborhood in said corresponding neighborhood transformation stage; and communication means connected to said at least one transformation detection means for transferring data to the host computer separately from the image pixels, said data being related to the output signals from said transformation detection means whereby image processing time may be decreased by permitting the host computer to determine from said data whether or not a transformation has occurred in the image in the at least one neighborhood transformation stage without the necessity of transferring the image pixels back to the host computer for analyses.

2. The improvement of claim 1 which includes:

logic means having an input coupled to said transformation detection means, operative to provide an output signal of a given state if any transformations occur for the image being analyzed by the corresponding neighborhood transformation stage.

3. The improvement of claim 2 wherein the image processing system includes a plurality of neighborhood transformation stages connected together in a pipeline, and wherein said logic means comprises an open collector device having an output that can be connected together in a single line with the logic means of other neighborhood transformation stages to the host computer, whereby a given state of said line indicates that no transformations have occurred in any of the neighborhood transformation stages in the pipeline.

4. The improvement of claim 3 wherein said logic means includes an enable input which is programmable from the host computer, operative to enable said logic means in selected neighborhood transformation stages so that the host computer can determine whether or not transformations have occurred in selected neighborhood transformation stages whose logic means have been enabled.

5. The improvement of claim 3 which further includes:

counter means coupled to said transformation detection means for storing the number of transformations that have occurred in said corresponding neighborhood transformation stage.

* * * * *